INVENTOR.
WYNYARD LINDSAY FAIRCLOUGH
BY
McGhew & Toren
ATTORNEYS.

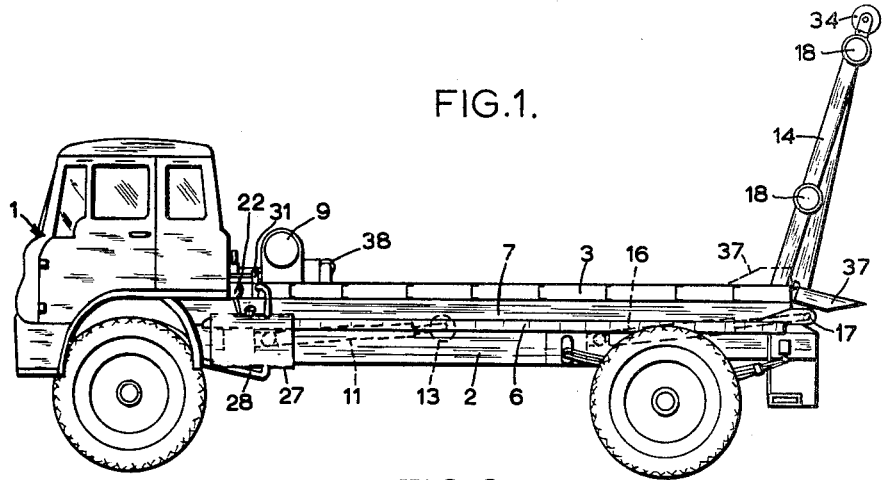
FIG.1.
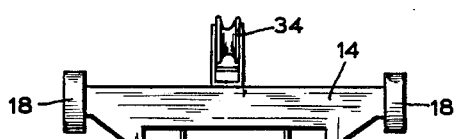
FIG.2.
FIG.2.ᵃ
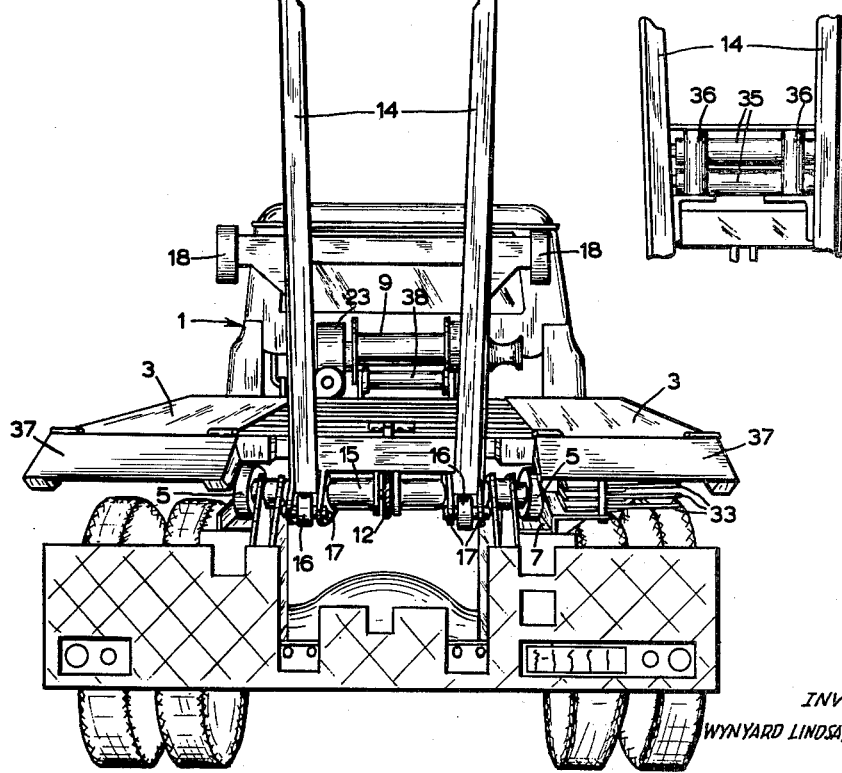

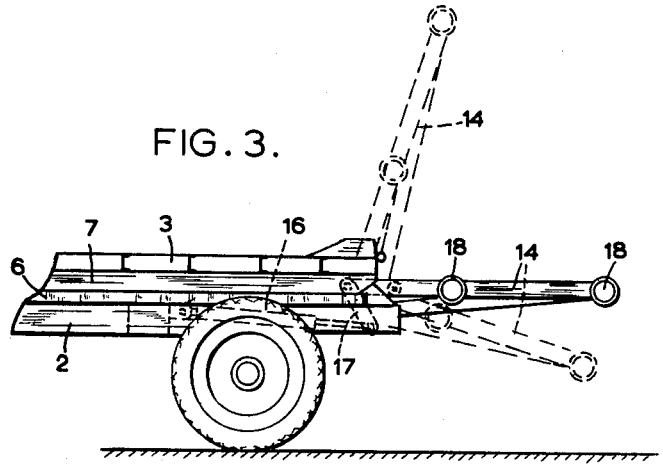
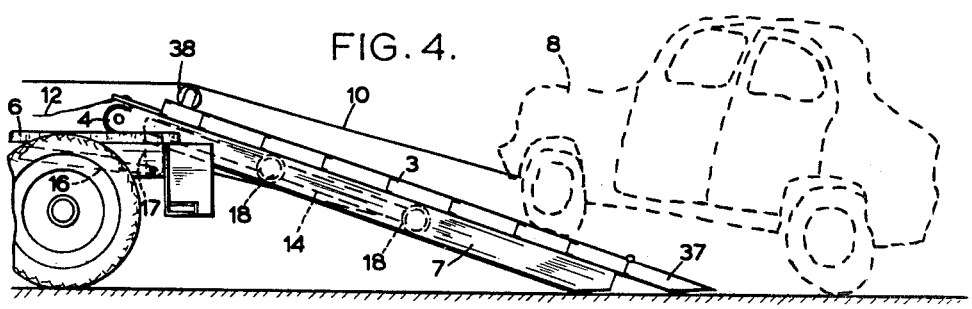
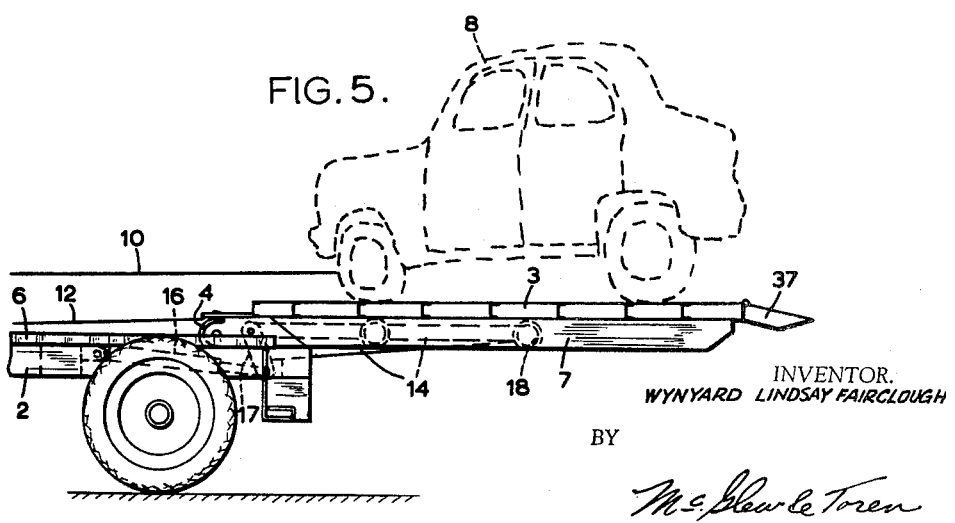

*INVENTOR.*
WYNYARD LINDSAY FAIRCLOUGH

*ATTORNEYS.*

United States Patent Office 3,257,020
Patented June 21, 1966

3,257,020
APPARATUS FOR LOADING AND UNLOADING VEHICLES AND OTHER OBJECTS ON AND FROM A TRANSPORTING VEHICLE
Wynyard L. Fairclough, 160 Gloucester St., Christchurch, New Zealand
Filed Sept. 25, 1964, Ser. No. 399,181
Claims priority, application New Zealand, Sept. 26, 1963, 135,976
7 Claims. (Cl. 214—83.24)

The invention relates to apparatus for loading and unloading vehicles and other objects on and from a transporting vehicle, and has particular reference to apparatus for use in loading and unloading damaged motor vehicles on and from a break-down truck.

The general object of the invention is to provide improved apparatus for the purpose mentioned, whereby the loading and unloading operations may be effected in a rapid and efficient manner, and, in the case of damaged motor vehicles, without causing the weight of the damaged vehicle to be taken on any portion of that vehicle other than its wheels, so long as these remain capable of supporting the vehicle.

Particular objects and advantages of the invention will be apparent from the following description.

The apparatus provided by the invention consists of a deck mounted on a transporting vehicle and slidable to extend rearwardly thereof, the deck being pivotally connected to the vehicle so that, when the deck is slid rearwardly to its fullest extent, it can be lowered until its rear end rests on the ground so that the deck provides an inclined ramp onto which a vehicle or other object to be transported can be moved; a jib pivotally mounted on the transporting vehicle at the rear end thereof, and capable of being turned to a raised position in which it extends above the deck when the deck is in its forward position, and to a horizontal position in which it affords a support for the deck when the deck is slid rearwardly off the transporting vehicle, and to a lowered position in which the deck is lowered with the jib until the rear end of the deck rests on the ground; and hydraulically operated control means whereby the deck can be slid rearwardly and forwardly and the jib lowered and raised, the jib also being operable to raise the deck from its lowered position to its horizontal position, from which the deck, together with a vehicle or other object thereon, can be slid forwardly onto the transporting vehicle.

A winch and cable may be provided in association with the deck, for the purpose of winching immobile vehicles or other objects onto the ramp formed by the deck when the deck is in its rearwardly extended and downwardly inclined position.

Conveniently, the hydraulic control means whereby the deck and the jib are operated are driven from the motor of the transporting vehicle, although a separate motor may be provided if desired.

Apparatus consistituting one embodiment of the invention, incorporated in a break-down truck for the removal of damaged vehicles, will now be described in more detail by way of example of how the invention can be carried into effect, and with reference to the accompanying drawings, in which:

FIGURE 1 is a side elevation of a break-down truck incorporating the said apparatus;

FIGURE 2 is a rear perspective view of the truck and apparatus shown in FIGURE 1, a portion of the apparatus at the rear of the truck having been omitted for the sake of clarity;

FIGURE 2a is a fragmentary view of part of the apparatus as shown in FIGURE 2, with the addition of the portion omitted in FIGURE 2;

FIGURES 3, 4 and 5 are side elevations of the rear part of the truck and apparatus shown in FIGURE 1, showing different positions of the apparatus at different stages during the loading of a damaged motor car on the truck by means of the apparatus;

Figure 9:
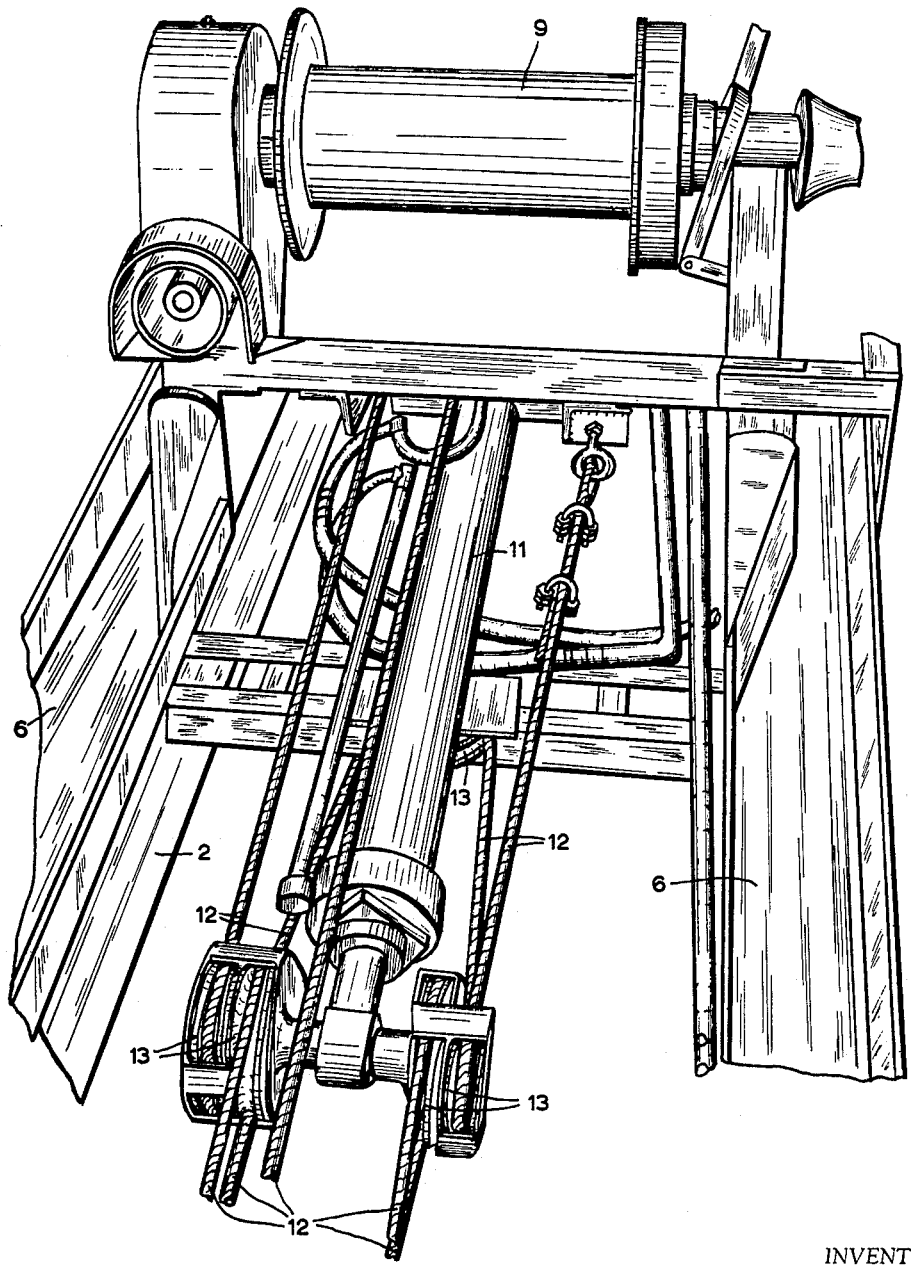
Figure 10:
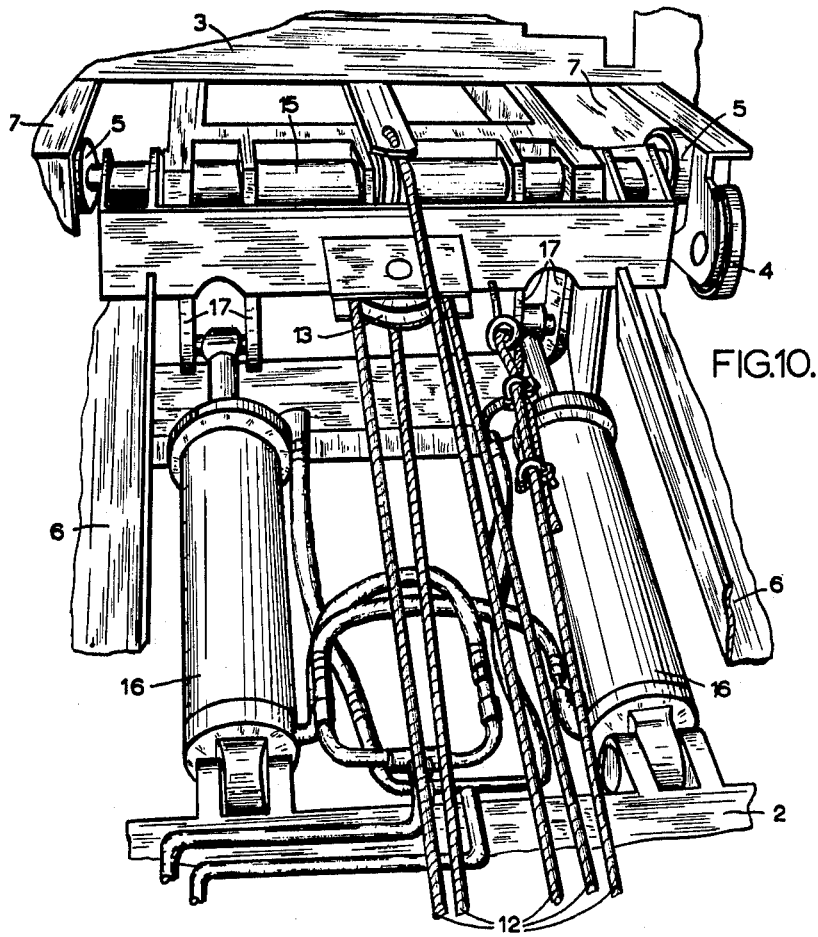
Figure 11:
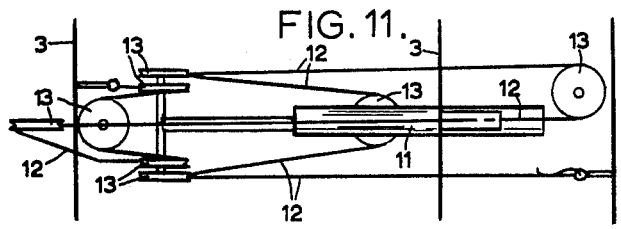
Figure 12:
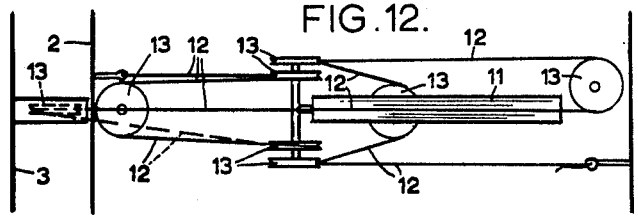

FIGURES 9 and 10 are perspective views looking respectively forwards and rearwards from a point above approximately the part of the truck shown at the extreme left of FIGURE 5, the apparatus being in its position shown in FIGURE 4; and FIGURES 11 and 12 are schematic plans of mechanism whereby a deck constituting a part of the said apparatus is moved between a retracted to an extended position, showing the position of the mechanism in, respectively, a partly extended and a fully extended position of the deck.

In the drawings, the break-down truck is indicated generally by the reference numeral 1 in FIGURES 1 and 2, and has a rear chassis portion 2 which extends rearwardly from the driver's cab of the truck. The said apparatus incorporated in the truck 1 includes a metal deck 3 which, in the normal travelling position of the truck, is carried on the rear chassis portion 2 of the truck behind the driver's cab, and covers substantially the whole area which would normally be occupied by a conventional truck tray, if such were provided on the truck.

The deck 3 is slidably mounted on the chassis portion 2 of the truck, being supported on rollers 4 and 5 provided respectively on the forward end of the deck 3 and on the rear end of the chassis portion 2, the rollers 4 and 5 running respectively in channel guides 6 and 7 on the chassis portion 2 and deck 3. From its normal forward travelling position shown in FIGURES 1, 2 and 3, the deck 3 can be slid rearwardly until its forward end is at the rear end of the the truck 1, the deck being then lowerable around the rollers 5 at the rear end of the chassis portion 2 until the rear end of the deck rests on the ground, as shown in FIGURE 4. In that position, the deck 3 forms an inclined ramp onto which a damaged motor vehicle (as indicated at 8 in FIGURES 4 and 5) can be moved, either under its own power or by means of a winch 9 and cable 10 provided on the truck for that purpose, just behind the cab of the truck.

The forward and rearward sliding movement of the deck 3 in relation to the rear chassis portion 2 of the truck 1 is effected by means of a double-acting hydraulic ram 11 connected to the deck 3 by means of a cable 12 anchored at one end to the truck 1 and at the other end to the deck 3, and passing around a series of sheaves 13, according to the arrangement shown in FIGURES 9 and 10, and shown schematically in FIGURES 11 and 12. The arrangement of the cable 12 and sheaves 13 is such that retraction and extension of the plunger of the ram 11 effect respectively the extension and retraction of the deck 3.

The apparatus also includes a hydraulically controlled jib 14 which is pivoted cantilever-fashion on a cross shaft 15 at the rear end of the truck 1, and which can be raised or lowered around an axis which is parallel to the wheel axes of the truck, and also to the axis around which the deck 3 is turnable between its horizontal and its inclined positions when the deck is extended. Pivotal movement of the jib 14 between its raised and lowered positions is effected by means of a pair of hydraulic rams 16 acting between the chassis portion 2 of the truck and the jib 14, the plungers of the rams being pivotally pinned between a pair of bifurcated goosenecks 17 at the pivoted end of the jib 14, as shown particularly in FIGURE 10.

In the normal travelling condition of the truck, the deck 3 is retracted to lie in a horizontal position wholly on the rear chassis portion 2 of the truck, and the jib 14 is raised to extend above the rear end of the deck 3, as shown in FIGURES 1 and 2. When the deck 3 is to be extended and lowered to provide a ramp onto which a vehicle can be moved, the jib 14 is lowered by operation of the rams 16 to a horizontal position (shown in full lines in FIGURE 3) in which it projects rearwardly of the truck 1, and the deck 3 is extended rearwardly by operation of the ram 11 until it is substantially clear of the rear portion 2 of the truck and is supported on the jib 14, in the position shown in FIGURE 5. The jib 14 is then lowered until the rear end of the deck 3 rests on the ground, as shown in FIGURE 4.

When a vehicle 8 to be transported has been moved onto the ramp provided by the inclined deck 3, the jib 14 is raised to its horizontal position, as shown in FIGURE 5, and the deck 3, with the vehicle 8 thereon, is retracted by operation of the ram 11 until the deck is again supported wholly on the rear chassis portion 2 of the truck. The jib 14 is then raised to its travelling position, as shown in FIGURES 1 and 2, and in broken lines in FIGURE 3.

The jib 14 is provided with rollers 18 which run in the channel guides 7 of the deck 3, to ensure a smooth sliding movement of the deck 3 over the horizontally positioned jib 14 during extension and retraction of the deck in the manner just described.

Figure 6:
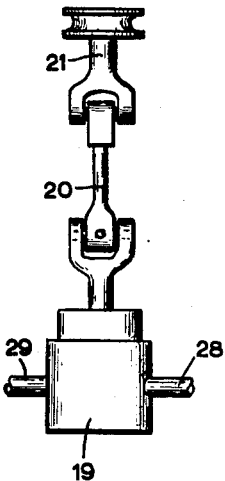
FIGURE 6 is a plan of the drive from the motor of the truck to hydraulic control means forming part of the said apparatus.
Figure 7:
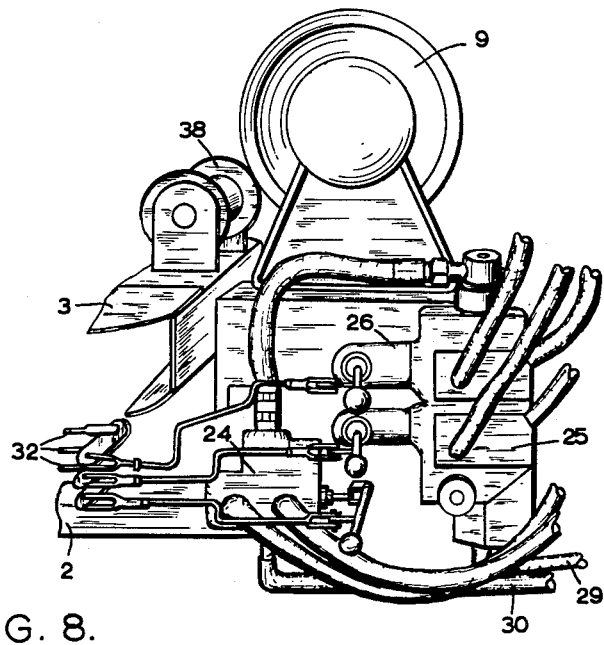
FIGURES 7 and 8 are perspective views of different parts of the hydraulic controls means.
Figure 8:
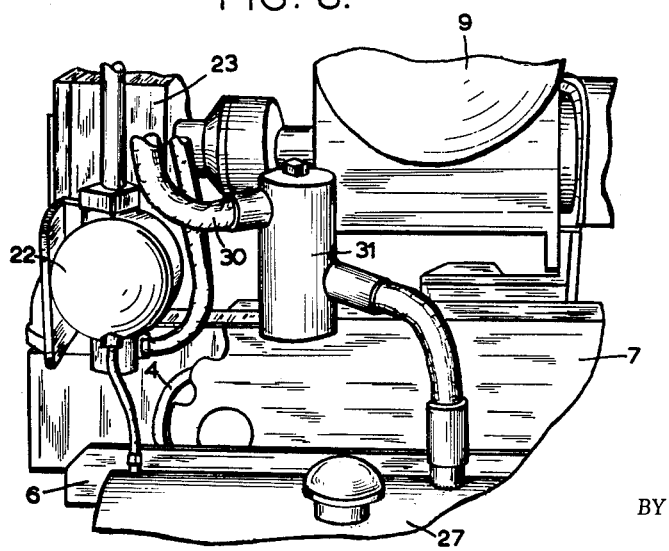

The ram 11 and cable 12, and the rams 16, form part of hydraulically operated control means included in the apparatus, whereby the loading and unloading operations described above are carried out. Other components of the said control means, shown particularly in FIGURES 6, 7 and 8 of the drawings, include a hydraulic pump 19 (shown in FIGURE 6) which is mounted at the front end of the truck 1 and is connected by a drive 20 to a power take-off 21 at the front of the crankshaft of the truck motor; a hydraulic motor 22 (shown in FIGURE 8, and also in FIGURE 2) which is driven from the pump 19 and drives the winch 9 through a reduction gearbox 23; and an assembly of hydraulic control valves 24, 25, and 26 (shown in FIGURE 7), which control the supply of hydraulic fluid from the pump 19 to, respectively, the ram 11 operating the deck 3, the rams 16 operating the jib 14, and the hydraulic motor 22 operating the winch 9. When the pump 19 is in operation, hydraulic fluid is drawn into the pump through a hose 28 (shown in FIGURE 6) from a reservoir of hydraulic fluid in a tank 27, and circulated by the pump 19 through the control valves 24, 25, and 26 via a hose 29, thence back to the tank 27 through a hose 30 and oil filter 31 (shown in FIGURE 8). Hydraulic restrictor valves are provided in the return line through the hose 30, and also in the hydraulic circuit of the deck ram 11, for the purpose of preventing excessive pressure at the tank 27 and ensuring a smooth action of the ram 11.

The operating handles of the control valves 24, 25, and 26 are connected by link rods 32 to a duplicate set of operating handles 33 provided at the rear end of the truck 1, as shown in FIGURE 2, so that the control valves can be remotely operated by an operator standing beside the rear end of the truck.

When the winch 9 is used to move a damaged vehicle 8 onto the ramp formed by the rearwardly extended and downwardly inclined deck 3, as shown in FIGURE 4 of the drawings, the cable 10 of the winch passes over a roller 38 rotatably mounted above the forward end of the deck 3, as shown in FIGURE 4.

When the winch 9 is used, before rearward extension of the deck 3, to recover a damaged vehicle which has, for example, gone over the edge of a road and down a bank or into a stream or river beside the road, the winch cable 10 is led either over a swivelling pulley 34 at the free end of the jib 14 (shown in FIGURES 1 and 2), or through a roller assembly (shown in FIGURE 2a) mounted between the longitudinal side members of the jib 14 adjacent to its pivoted end, and comprising a pair of horizontal rollers 35 and a pair of vertical rollers 36. The upper one of the horizontal rollers 35 is movable against the influence of a pair of springs (not shown in the drawings) so as to increase its distance from the lower roller 35, according to the thickness of the cable 10 passing between the rollers 35. The vertical rollers 36 act as lateral thrust bearings when the load on the end of the cable 10 is at right angles to the length of the truck 1, on either side thereof. The pulley 34 on the upper end of the raised jib 14 will be used as a bearing for the winch cable 10 when a greater upward component is desired in the pull exerted on the load at the end of the cable, as in the case of a car which has crashed down a steep bank beside the road.

A pair of short ramp plates 37 are hinged to the rear end of the deck 3, to facilitate the loading of a vehicle onto the deck 3, when the deck is in its inclined position shown in FIGURE 4.

By providing the extensible and inclinable deck 3 onto which a damaged vehicle can be moved, and whereby the vehicle can be subsequently lifted and moved into position on the rear portion of the break-down truck 1, the apparatus avoids difficulties associated with conventional break-down vehicles, both those in which a crane is used to lift one end of the damaged vehicle clear of the ground, and those in which a fork-lift or similar device is used to lift the whole vehicle clear of the ground. Use of a crane is not always possible, especially in cases where both the front and the rear wheels of the vehicle have been damaged, and use of a fork-lift device frequently results in further damage to the vehicle during lifting and transportation.

When fitted to a break-down truck, the apparatus described above enables a damaged vehicle to be rapidly and easily loaded onto the truck, and unloaded therefrom after the vehicle has been transported by the truck to a desired place.

I claim:

1. Apparatus for loading and unloading vehicles and other objects on and from a transporting vehicle, and comprising a deck mounted on a transporting vehicle and slidable to extend rearwardly thereof, the deck being pivotally connected to the vehicle so that, when the deck is slid rearwardly to its fullest extent, it can be lowered until its rear end rests on the ground so that the deck provides an inclined ramp onto which a vehicle or other object to be transported can be moved; a jib pivotally mounted on the transporting vehicle at the rear end thereof, and capable of being turned to a raised position in which it extends above the deck when the deck is in its forward position, and to a horizontal position in which it affords a support for the deck when the deck is slid rearwardly off the transporting vehicle, and to a lowered position in which the deck is lowered with the jib until the rear end of the deck rests on the ground; and hydraulically operated control means whereby the deck can be slid rearwardly and forwardly and the jib lowered and raised, the jib also being operable to raise the deck from its lowered position to its horizontal position, from which the deck, together with a vehicle or other object thereon, can be slid forwardly onto the transporting vehicle.

2. Apparatus according to claim 1, and including a winch and cable mounted on the transporting vehicle forwardly of the deck, and operably connected to the said control means.

3. Apparatus according to claim 1, and wherein the said control means are drivingly connected to the motor of the transporting vehicle.

4. Apparatus according to claim 1, and wherein the said control means including a double-acting hydraulic ram connected to the deck by means of a cable passing around a series of sheaves, the arrangement of the cable and sheaves being such that retraction of the plunger of the ram effects extension of the deck, whilst extension of the said plunger effects retraction of the deck.

5. Apparatus according to claim 1, and wherein the said control means include a pair of hydraulic rams acting between the truck and the jib, the plungers of the rams being pivotally pinned between a pair of bifurcated goosenecks at the pivoted end of the jib, so that extension of the said plungers raises the jib, whilst retraction of the plungers lowers the jib.

6. Apparatus according to claim 2, and wherein the said control means include a hydraulic motor drivably connected to the winch through a reduction gearbox, and connected in the hydraulic circuit of the control means.

7. A transporting vehicle incorporating apparatus according to claim 1.

No references cited.

GERALD M. FORLENZA, *Primary Examiner.*

HUGO O. SCHULZ, *Examiner.*

A. J. MAKAY, *Assistant Examiner.*